United States Patent Office 3,508,926
Patented Apr. 28, 1970

3,508,926
METHOD FOR THE UTILIZATION OF BAKED FOOD PRODUCTS
Sanford Werbin, Dumont, N.J., and David Weinstein, Baltimore, and Irving H. Rubenstein, Stevenson, Md., assignors to Maryland Cup Corporation, Owings Mills, Md.
No Drawing. Continuation-in-part of application Ser. No. 568,125, July 27, 1966. This application Dec. 21, 1966, Ser. No. 603,435
Int. Cl. A23l 1/10
U.S. Cl. 99—1
13 Claims

ABSTRACT OF THE DISCLOSURE

Baked goods containing gelatinized starch as a result of the baking process are comminuted and then coated with a mixture of a melted shortening and an emulsifier to reduce water absorption and to render the mixture capable of agglomeration.

CROSS-REFERENCE TO RELATED APPLICATION

This application is a continuation-in-part of application Ser. No. 568,125, filed July 27, 1966, now abandoned.

BACKGROUND OF THE INVENTION

The present invention relates generally to the food art, and, more particularly, to the utilization of baked food products.

In the process of baking cakes, cookies, biscuits, ice cream cones, waffles, and similar starch-containing products, whereby the flour and starches present are exposed to baking temperatures of from 200° to 500° F., the starch becomes gelatinized by the heat of baking in the presence of the moisture of the batter, whether the starch is derived from the starch content of the flour or from any added starch in the formula. For consumption as an original baked food product, this is normally an acceptable reaction.

However, when it is found desirable to reuse crumbs or ground baked goods for secondary products, the presence of this starch, which has been fully or partially gelatinized in the baking process, presents certain problems when water is employed in the new formulation. Pregelatinized starch will absorb from 2 to 30 times its own weight of water, depending upon the degree of gelatinization and the type of starch, before a mixture of reasonable fluidity can be obtained. As a result, the batters will possess a comparatively low solids content, necessitating the evaporation of considerable water before an edible product with reasonably high solids content can be obtained.

Hence, a batter can not be readily made by simply mixing particles of previously baked goods with a reasonably small amount of water or milk. The protein present will, to a limited extent, absorb water in the ground finished baked goods. However, since the protein represents only about 8% to 14% of the flour in the finished product, its water absorption is small compared to that of the gelatinized starch present.

When, for instance, it is desired to manufacture a homogeneous product using baked goods in the form of crumbs or the like, in a breading mix, a flavored crunch, or a snack food, a much more uniform product can be prepared by combining the ingredients, such as crumbs, starches, sugars, and flavoring materials, and the like, in wet form, than by simply preparing a dry mechanical mixture of these ingredients. Similarly, when it is desired to make a crunch of uniform composition to be incorporated into soft ice cream in order to confer upon the frozen ice cream a cake-like flavor and texture, it is important to have the crumbs temporarily resist hydration until mechanical dispersion of the crumbs in the ice cream has been achieved. However, as indicated previously, the high gelatinized starch content of the crumbs presents processing difficulties owing to the high water absorption of the pregelatinized starch.

SUMMARY OF THE INVENTION

In accordance with the present invention, there is provided a method for treating particles of food material containing gelatinized starch to reduce their water absorptivity, which comprises admixing such particles with a mixture of a shortening material and at least one emulsifier therefor to coat and penetrate the particles.

The food material to which the method of the invention is particularly adaptable is baked goods, such as crumbs, ice cream cone chips, trimmings, products of attrition in the baking plants, and the like.

DESCRIPTION OF THE PREFERRED EMBODIMENTS

In accordance with the invention, the food material is first reduced in particle size, as by comminution, crushing or grinding, to a particulate form, such as granular or powdered form if it is not already in such form. The size of the particles depends upon the use to which the food material is to be put.

The comminuted food particles are treated with a shortening material admixed with at least one emulsifier, in the ratio of about 12 parts shortening material to about 1 to 4 parts of emulsifier by weight. The term shortening material as employed herein refers to a natural or hydrogenated animal or vegetable oil or fat. Examples include lard, butter, and other animal fats, as well as various vegetable oils commonly used in cooking, such as cottonseed or soy bean oil, both hydrogenated and nonhydrogenated.

The shortening material-emulsifier mixture is admixed thoroughly with the particulate food material until the latter becomes coated with and penetrated by the mixture. The penetration takes place at once on contact owing to the action of the emulsifier. Such penetration would be so unduly prolonged without the presence of the emulsifier as to be impracticable.

Conventional edible emulsifying agents may be employed, such as, for example, mono- and diglycerides of fatty acids or mixtures thereof, sorbitan derivatives of edible fatty acids, polyoxyethylene compounds of edible fatty acids, including glyceryl and sorbitan derivatives thereof, natural lecithin or modified lecithins such as any of the various hydroxylated products thereof, and egg yolk in either dry or liquid form.

The shortening material-emulsifier mixture is applied in melted form. The resulting coated particles are then capable of being agglomerated in the presence of a relatively small amount of water to form a homogeneous product of usable viscosity. Such agglomeration would not have been possible without the treatment of the present invention.

It was found, in accordance with the present invention, that by prewetting the particulate baked goods with the combination of oily and emulsifier ingredients, the amount of water required to form a product of satisfactory consistency is effectively reduced. The following table sets forth data demonstrating the greatly reduced amounts of water required for mixing with baked crumbs when employing the additives of the present invention (II and III), as compared with the same baked crumbs untreated.

TABLE 1

| I | II | III |
| --- | --- | --- |
| Baked crumbs, 40 parts by weight. | Baked crumbs, 40 parts by weight. | Baked crumbs, 40 parts by weight. |
| | Melted shortening, 12 parts by weight. | Melted shortening, 12 parts by weight. |
| | Mono- and diglycerides of fatty acids (emulsifier), 4 parts by weight. | Polyoxyethylene sorbitan monostearate (emulsifier), 1 part by weight. |
| Water, 200 parts by weight. | Water, 38 parts by weight. | Water 32 parts by weight. |

The amount of water necessary to obtain the desired consistency may be further reduced by employing as a sweetening agent a sugar syrup, serving as a source of sweetener and water in the mixture, rather than dry sugar. In this way a more homogeneous product is made, and further reduction of water absorption of the pregelatinized starch present is attained, the water of the batch apparently having a greater affinity for the dissolved sugar than for the pregelatinized starch.

This effect is illustrated by the modifications of the compositions of Table 1, as shown in Table 2.

TABLE 2

| II | III |
| --- | --- |
| Baked crumbs, 40 parts by weight. | Baked crumbs, 40 parts by weight. |
| Mono- and diglycerides of fatty acids (emulsifier), 4 parts by weight. | Melted shortening, 12 parts by weight. |
| Melted shortening, 12 parts by weight. | Polyoxyethylene sorbitan monostearate (emulsifier), 2 parts by weight. |
| 67° Brix sugar syrup, 28 parts by weight. | 67° Brix sugar syrup, 28 parts by weight. |
| Water, 8 parts by weight. | Water, 6 parts by weight. |

The proportion of the mixture of shortening material and emulsifier to the food material being treated is between about 30 and about 50 parts by weight per 100 parts of food material by weight.

The agglomerate thus prepared may be shaped until it acquires a stable physical form. The agglomerate may be further dispersed in a solid edible base material, or it may be spread in layers before being dried. The particles of agglomerate may also be deep-fat fried. These additional steps are illustrated in the examples.

The following examples serve to illustrate the practice of the invention, but are not to be considered as limiting:

EXAMPLE 1

Forty parts crisp ice cream cone chips were reduced to a granular form and a liquid mixture of 12 parts corn oil and 4 parts of Atmos 300 (a commercial mixture of mono- and diglycerides of fatty acids manufactured by Atlas Chemical Company of Wilmington, Del.) and one part polyoxyethylene sorbitan monostearate was combined with the granules and mixed until the granules became uniformly coated and impregnated with the liquid. Thirty-two parts water were then added to the coated granules and kneaded until the particles coalesced into a mass of homogeneous consistency. The resulting product was spread in a thin layer in a pie pan and baked at a temperature of 375° F. until the layer became crusty. It was crisp, had a tender crumb-like texture and flavor and served as an excellent shell for a chocolate cream pie filling.

EXAMPLE 2

The procedure of Example 1 was modified by substituting bread crumbs for the ice cream cone chips, using 8 parts lard, 4 parts cottonseed oil, and 4 parts Atmos 300 and 38 parts water. The mixture was processed and extruded as in Example 3, infra, the drying of the extruded particles being effected at 350° for 30 minutes. The resulting product was found to be an excellent breading mix for frying fish, chicken, veal, etc., with good surface adhering properties and did not become soggy when served.

When it is desired to increase the sweetness of the final product a sweetening agent may be added. To retain the most desirable consistency of the agglomerate the sweetening agent should be added in the form of a syrup as shown by the following examples, all parts being by weight.

EXAMPLE 3

Forty parts ice cream cone chips were reduced to a granular form as in Example 1. A mixture of 12 parts melted hydrogenated vegetable oil, 4 parts Atmos 300 were added and thoroughly mixed with the granulated crumbs until the granules were coated with the mixture. Then, 28 parts 67° Brix flavored cane syrup was added and then 8 parts water. The resulting composition was thoroughly kneaded until a cohesive homogeneous product was formed. This product was extruded through apertures of $\frac{1}{16}''$ diameter. The extrusions were cut into $\frac{1}{8}''$ lengths and the resulting pieces dried at 250° F. for about 20 minutes to form a crunchy confectionery product that served as an excellent topping for ice cream, cakes, cookies, etc.

EXAMPLE 4

The procedure of Example 3 was modified by using 40 parts of stale cake crumbs, 12 parts soy bean oil, 4 parts Atmos 300, 2 parts polyoxyethylene sorbitan monostearate, and 28 parts 67° Brix sugar syrup. Six parts water were then added.

The agglomerate after extrusion was dried at 350° F. for 30 minutes. The resulting particles were crunchy and were mixed with melted milk chocolate in the ratio of 1 to 6, respectively. The resulting product was permitted to cool and harden producing a confection of unusually delightful taste and texture.

EXAMPLE 5

The procedure of Example 3 was repeated using 40 parts ice cream cone chips, 12 parts melted hydrogenated cottonseed oil, 2 parts Atmos 300 and 28 parts 67° Brix sugar syrup. Ten parts water were then added.

The extruded material was mixed with 15 parts liquid egg whites and a flavorful amount of Almond extract. This mixture was dropped on a baking pan in batches of about 1" diameter and baked at 325° F. for 15 minutes to form almond flavored cookies of crisp texture capable of withstanding usualy commercial handling.

EXAMPLE 6

The extrusions of Example 3 were cut into 1" lengths and deep-fat fried at 400° F. for about five minutes. After draining the fried pieces and drying them in the air, the resulting product was edible as a snack food with a fine flavor and texture.

EXAMPLE 7

A crunch was prepared as described in Example 3. The finished product was introduced into a fruit feeder, which is a machine used in the ice cream industry and designates a piece of machinery for adding fruit, nuts, candy, cake, and the like, to soft ice cream as it is discharged from the ice cream freezer prior to reaching the packaging machines. The fruit feeder was adjusted to feed one part of crunch to 5 parts of soft ice cream. Immediately after packaging, the crunch was well dispersed. Twenty-four hours later, there were no visible residues and the ice cream had developed a characteristic cake-like aspect.

We claim:

1. The method of treating particles of baked food material containing gelatinized starch to reduce their water absorptivity which comprises admixing said particles with a liquid mixture of a shortening material and at least one emulsifier therefor to uniformly coat and penetrate said particles and then further admixing said coated particles with an amount of water sufficient to cause said coated particles to coalesce into a mass of homogeneous consistency.

2. The method as defined in claim 1 wherein at least a portion of the water added is in the form of a sugar syrup.

3. The method as defined in claim 1 wherein the proportion of emulsifier to shortening material is between about 1 and about 4 parts by weight to 12 parts by weight of shortening material.

4. The method as defined in claim 1 wherein the proportion of said mixture of shortening material and emulsifier to the food material is between about 30 and about 50 parts per 100 parts of food material, by weight.

5. The method as defined in claim 1 wherein the emulsifier is a mixture of mono- and diglycerides of fatty acids.

6. The method as defined in claim 1 wherein the emulsifier is polyoxyethylene sorbitan monostearate.

7. The method as defined in claim 1 wherein the coated particles are kneaded in the presence of water to form a homogeneous agglomerate.

8. The method as defined in claim 7 wherein said agglomerate is shaped and cooked until it acquires a stable physical shape.

9. The method as defined in claim 8 wherein the agglomerate is spread in layers before being cooked.

10. The method as defined in claim 8 wherein particles of the agglomerate are deep-fat fried.

11. The method as defined in claim 7 wherein particles of said agglomerate are further dispersed in a solid edible base material.

12. The method as defined in claim 1 wherein the shortening material is selected from the group consisting of natural and hydrogenated animal and vegetable oils and fats.

13. The method as defined in claim 1 wherein the food material is ice cream cone chips.

References Cited

UNITED STATES PATENTS

| | | | |
|---|---|---|---|
| 2,255,506 | 9/1941 | Frediani | 99—89 XR |
| 2,632,705 | 3/1953 | Scharf. | |
| 2,632,707 | 3/1953 | Battiste | 99—90 |
| 2,796,350 | 6/1957 | Grennan et al. | 99—94 XR |
| 3,135,612 | 6/1964 | Hair et al. | 99—94 |
| 3,158,486 | 11/1964 | Morck et al. | 99—86 |
| 3,244,534 | 4/1966 | Buddemeyer et al. | 99—94 XR |

LIONEL M. SHAPIRO, Primary Examiner

J. R. HOFFMAN, Assistant Examiner

U.S. Cl. X.R.

99—83, 86, 92